(12) United States Patent
Peterson et al.

(10) Patent No.: US 9,179,660 B2
(45) Date of Patent: Nov. 10, 2015

(54) HIGH LINOLENIC LINSEED OIL COMPOSITIONS

(76) Inventors: Lillian Peterson, Manitoba (CA);
Nathan Golas, Manitoba (CA)

( * ) Notice: Subject to any disclaimer, the term of this patent is extended or adjusted under 35 U.S.C. 154(b) by 953 days.

(21) Appl. No.: 12/092,515

(22) PCT Filed: Nov. 3, 2006

(86) PCT No.: PCT/CA2006/001799
§ 371 (c)(1),
(2), (4) Date: Oct. 3, 2008

(87) PCT Pub. No.: WO2007/051302
PCT Pub. Date: May 10, 2007

(65) Prior Publication Data
US 2009/0314180 A1 Dec. 24, 2009

Related U.S. Application Data

(60) Provisional application No. 60/732,711, filed on Nov. 3, 2005.

(51) Int. Cl.

| | | |
|---|---|---|
| *C09D 191/00* | (2006.01) | |
| *C09J 191/00* | (2006.01) | |
| *A01K 97/18* | (2006.01) | |
| *C08L 63/00* | (2006.01) | |
| *C09J 163/10* | (2006.01) | |
| *C08K 5/1515* | (2006.01) | |
| *C08L 91/00* | (2006.01) | |
| *C09J 163/00* | (2006.01) | |
| *C09D 163/00* | (2006.01) | |
| *C08L 63/10* | (2006.01) | |
| *C08K 9/04* | (2006.01) | |
| *C08K 9/02* | (2006.01) | |
| *C09D 163/10* | (2006.01) | |

(52) U.S. Cl.
CPC ............. *A01K 97/18* (2013.01); *C08K 5/1515* (2013.01); *C08K 9/02* (2013.01); *C08K 9/04* (2013.01); *C08L 63/00* (2013.01); *C08L 63/10* (2013.01); *C08L 91/005* (2013.01); *C09D 163/00* (2013.01); *C09D 163/10* (2013.01); *C09D 191/005* (2013.01); *C09J 163/00* (2013.01); *C09J 163/10* (2013.01); *C09J 191/005* (2013.01)

(58) Field of Classification Search
CPC ....... C08L 91/005; C08L 63/00; C08L 63/10; C09D 191/005; C09D 163/00; C09D 163/10; C09J 191/005; C09J 163/00; C09J 163/10; C08K 5/1515; C08K 9/02; C08K 9/04
See application file for complete search history.

(56) References Cited

U.S. PATENT DOCUMENTS

| | | | |
|---|---|---|---|
| 5,055,548 A | 10/1991 | Cosgrove | |
| 5,137,965 A | 8/1992 | Knox | |
| 6,870,077 B2 | 3/2005 | Kenaschuk et al. | |
| 2003/0159172 A1* | 8/2003 | Kenaschuk | 800/281 |

FOREIGN PATENT DOCUMENTS

| | | |
|---|---|---|
| FR | 2850663 | 8/2004 |
| WO | WO03062306 | 7/2003 |
| WO | WO2006031743 | 3/2006 |

OTHER PUBLICATIONS

Overeem et al, Seed oils rich in linilenic acid as renewable feedstock for environment-friendly crosslinkers in powder coatings, International Crops and Products 10 (1999) pp. 157-165.*
Boquillon et al, "Polymer networks derived from curing of epoxidized linseed oil: influence of different catalysts and anhydride hardeners", Polymer 41 (2000) pp. 8603-8613.*
Merginate, product data sheet, http://www.hobum.de/de/products/products_1.html, originally posted Nov. 30, 2003.*
Friedt, W. et al "In vitro breeding of high-linolenic, doubled-haploid lines of linseed (*Linum usitatissium* L) via androgenesis" Plant Breeding 1995 114, 322-326.
Bickert, C. et al Variation for fatty acid content and triacylglycerol compositions in different *Linum* species: Industrial Crops and Products, 1994, 2, 229-237.
Ahmed, F.A. et al. "Effect of some herbicidal treatments on flax plats, seed composition, and see oil constituents", Grasas y Aceites, 1987, vol. 38, 278-285.
Merrien A, et al. "Sources et monographies des principaux corps gras", Manuel des corps gras. 1992, Chapter 3, p. 116-180.
Plonka F. "Introduction", Les Varietes de Lin, 1956, p. 9-27.

* cited by examiner

*Primary Examiner* — David M Brunsman
(74) *Attorney, Agent, or Firm* — Synthesis Intellectual Property, LLC; Jonathan T. Goodman

(57) ABSTRACT

The present invention pertains to the uses of HiOmega flax (linseed) oil, a naturally occurring flax (linseed) with higher than normal alpha linolenic acid content in the production of stronger, more scratch and solvent resistant industrial products such as alkyd resins, epoxidized oils, epoxies, inks, coatings such as paints, enamels, varnishes and films and antispalling concrete preservatives.

8 Claims, No Drawings

HIGH LINOLENIC LINSEED OIL COMPOSITIONS

PRIOR APPLICATION INFORMATION

This application is a 371 of PCT/CA06/01799 filed Nov. 3, 2006. This application claims the benefit of U.S. Provisional Application 60/732,711, filed Nov. 3, 2005.

BACKGROUND OF THE INVENTION

High alpha linolenic acid flax (linseed) oil contains triglycerides which are composed of three unsaturated fatty acids side chains attached to a glycerol backbone. The three unsaturated fatty acids contain nonconjugated double bonds. Unsaturated indicates double bonds exist in the fatty acid chain and nonconjugated indicates these double bonds are separated by at least two single bonds. In High alpha linolenic acid flax (linseed) oil the three unsaturated fatty acid side chains consist primarily of alpha linolenic acid (C18: 3, omega 3, or 9,12,15-Octadecatrienoic acid), linoleic acid (C18: 2, or 9,12 Octadecadienoic acid) and oleic acid (C18: 1). High alpha linolenic acid flax (linseed) oil contains 65% or greater of alpha linolenic acid, an unsaturated fatty acid.

The linolenic content of non-High alpha linolenic acid Canadian flax cultivars varies from 49-62% depending on cultivar and growing conditions. Temperature during seed formation and photoperiod influences the concentration of fatty acid in the linseed oil. Cool temperatures and longer photoperiod increases linolenic content. Other factors which may affect the variability of linolenic content are soil moisture, soil fertility and presence of disease. It is noted that oil derived from most flax varieties has the following fatty acid composition:

| Common Name | Fatty Acid | Percentage |
| --- | --- | --- |
| Palmitic Acid | 16:0 | 4-10 |
| Palmitoleic Acid | 16:1 | <0.5 |
| Stearic Acid | 18:0 | 2-8 |
| Oleic Acid | 18:1 | 10-20 |
| Linoleic Acid | 18:2 | 14-20 |
| Alpha Linolenic Acid | 18:3 (n − 3) | 45-65 |
| Arachidic Acid | 20:0 | <0.5 |
| Eicosenoic Acid | 20.1 | <0.5 |

Linseed is grown primarily for its oil which has many industrial uses because of its drying property. Industrial uses of this oil include but are no means limited to the manufacture of paints and coatings, oil cloth, printing ink, soap, patent leather, core oils, brake linings, adhesives, manufacture of hardboard and fibreboard, protective coatings, paint primers, varnishes, lacquers, tarpaulin and other coated fabric, newsprint, caulking compounds, waterproofing compounds, mastic cements, shoe polish, herbicide and pesticide carrier, antispalling and curing agent for concrete surfaces including highways and bridges, tempering oil and bonding oil. Examples of industrial uses of linseed oil include but are no means limited to U.S. Pat. Nos. 5,965,633, 5,693,715, 5,653,789, 3,488,202 and 4,002,585.

In order for a naturally occurring oil to be classified as a "drying oil", the drying index must exceed 70. A drying oil is defined as an oil which hardens to a tough, solid film with absorption of oxygen either from the environment (autoxidation) or with the addition of oxygen through chemical reactions i.e. with peracids. The term "drying" does not refer to the evaporation of water or other solvents, but to a series chemical reaction wherein the fatty acid side chains of the triglyceride are polymerized and cross linked. Drying oils are a key component of oil paint and many varnishes. Some commonly used drying oils include linseed oil, tung oil and perilla oil. The "drying", hardening, or curing of linseed oil is the result of an exothermic reaction as the oil polymerizes to form long, chain-like molecules. The oil polymers cross-link to form a network which results in a solid film. Over time, ionic bonds also form between functional groups and metal ions of the pigment (for example in paints).

The drying index of an oil is calculated as % linoleic acid+2(% linolenic acid). The higher the drying index, the more quickly the oil will harden and the resultant film will be tougher and stronger. The drying index of High alpha linolenic acid flax (linseed) oil is 250 or greater. The excellent drying property of linseed oil arises from the ability to form cross-linkages by modifications of the nonconjugated double bonds in the fatty acid chain. Crosslinking occurs by several methods, primarily when the activated methylene groups in the unsaturated fatty acids or oils of the alkyd are oxidized to give hydroperoxides, which subsequently decompose to generate free radicals, leading to oxidative crosslinking. This oxidative crosslinking process is commonly accelerated by adding driers, such as, for example, the various salts of cobalt, zirconium, calcium, and manganese. Carbon to carbon cross linking can also occur. Cross-linking may be induced using chemicals i.e. peroxides, sulfur vulcanization, driers or by epoxidation or by physical means, i.e. light, heat, air, atmospheric oxygen, uv radiation or γ radiation, applying heat or blowing air while applying heat or by other methods. Using a drying oil with a high concentration of unsaturated fatty acid such as flax (linseed) oil yields a strong, tear-resistant film. For example, as compared to other drying oils, polymerized flax (linseed) oil used as a biodegradable coating for zein films, exhibits better resistance to water vapor permeability, toughness, and elongation without a decrease in tensile strength.

High alpha linolenic acid flax (linseed) oil contains a high concentration of unsaturated fatty acid thus yields more material available for cross linking and/or polymerization per unit weight. Thus materials based on a crosslinked oil result in a tougher, stronger final product.

Epoxidation of linseed oil is an effective method of inducing cross-linking and such films have high tensile strength, stiffness and tear resistance. Epoxidation replaces double bonds in the unsaturated fatty acid with a highly reactive cyclic ether or oxirane group. In this functional group there is an oxygen atom bonded to two neighboring carbon atoms creating a highly strained three sided ring. The high strain on the ring structure weakens the carbon-oxygen bonds allowing the ring to readily break open and form other, more stable bonds. The oxirane value of a compound is a measure of the number of epoxy groups present in the product i.e. a measure of the amount of epoxidized double bonds. Epoxidized High alpha linolenic acid flax (linseed) oil with 65% or greater alpha linolenic acid has an EO value or oxirane value of 10.0% or greater.

SUMMARY OF THE INVENTION

The present invention relates to the use of naturally occurring High alpha linolenic acid flax (linseed) oil with 65% or greater alpha linolenic acid content in the production of various useful industrial substances such as alkyd resins, epoxidized oils, coatings such as paints, enamels and varnishes, an anti-spalling surface concrete preservative, a solidified linseed oil, a maleinated linseed oil, an ink, an epoxy, and a zein film coating. In all such uses which are composed of High alpha linolenic acid flax (linseed) oil containing 65% or greater alpha linolenic acid or reaction products of High alpha linolenic acid flax (linseed) oil containing 65% or greater alpha linolenic acid wherein the High alpha linolenic acid flax (linseed) oil is reacted with various chemicals as described herein products are formed which are stronger, more flexible, more scratch resistant, more solvent resistant and dry faster.

According to an aspect of the invention, there is provided the use of High alpha linolenic acid flax (linseed) oil containing 65% or greater alpha linolenic acid in the production of a product selected from the group consisting of: an alkyd resin, an epoxidized oil, coatings, paints, enamels, varnishes, an anti-spalling surface concrete preservative, a solidified linseed oil, a maleinated linseed oil, an epoxy, an ink, and a zein film coating wherein said products which are stronger and dry faster compared to similar products made with regular linolenic flax (linseed) oil.

The product may comprise High alpha linolenic acid flax (linseed) oil containing 65% or greater alpha linolenic acid or reaction products of High alpha linolenic acid flax (linseed) oil containing 65% or greater alpha linolenic acid.

The product may be an alkyd resin composition comprising the reaction product of a) from about 10 to about 50 mole %, based on the total composition of the alkyd resin, of a fatty acid, a fatty ester, or a naturally occurring oil b) from 1 to about 30 mole %, based on the total composition of the alkyd resin, of a divalent alcohol or diol;

c) from about 10 to about 40 mole %, based on the total composition of the alkyd resin, of a polyol;

d) from about 20 to about 40 mole %, based on the total composition of the alkyd resin, of a polyacid; and e) from 1 to about 10% mole, based on the total composition of the alkyd resin, of a monofunctional acid.

Optionally, a catalyst, the mole % based on the total moles of (a), (b), (c), (d) and (e) may be added.

The product may be an epoxidized oil comprising the reaction product of: a fatty acid, fatty ester or naturally occurring oil; an acid, peracid or peroxyacid; and enzymatic epoxidation.

The alkyd resin may be mixed with a solvent, driers and additives; pigment and drying oil to form a paint or enamel. In these embodiments, the alkyd resin may be used in concentrations ranging from 3 to 45% by weight. The pigments may be selected from one or more of titanium dioxide, silicates, zinc oxide, calcium carbonate, tinting color, red oxide, rust inhibitive pigment, zinc stearate, modified zinc phosphate.

The product may be a varnish comprising a compatible mixture of resin, naturally occurring High alpha linolenic acid flax (linseed) oil containing 65% or greater alpha linolenic acid and solvents. The resin may be selected from amber, copal, rosin, alkyd or polyurethane resins. The oil may be a blend of High alpha linolenic acid flax (linseed) oil containing 65% or greater alpha linolenic acid and another drying oil selected from normal flax (linseed) oil, tung, oiticica, perilla and dehydrated castor oil. The solvent may be selected from mineral spirits, turpentine or xylene.

The product may be the anti-spalling surface concrete preservative comprising High alpha linolenic acid flax (linseed) oil, mineral spirits and dryers. The oil may be a blend of High alpha linolenic acid flax (linseed) oil with 65% or greater alpha linolenic acid and another drying oil selected from normal flax (linseed) oil, tung, oiticica, peril and soybean oil. The dryers may be one or more of cobalt, manganese, lead salts and napthenic acids. The proportional ratio of High alpha linolenic acid flax (linseed) oil containing 65% or greater alpha linolenic acid to mineral spirits ranges from 90:10 to 20:80, preferably 50:50.

The product may be solidified linseed oil synthesized from: High alpha linolenic acid flax (linseed) oil; a polyvalent alcohol; and a resin. The polyvalent alcohol may be glycerol or pentaerythritol. The resin may be alkyd resins or rosin.

The product may be maleinated linseed oil comprising the reaction product of High alpha linolenic acid flax (linseed) oil and maleic anhydride.

The product may be an epoxy comprising the reaction product of an High alpha linolenic acid flax (linseed) oil epoxy resin and a curing agent selected from amines, polyfunctional amines, polyethyleneamines, polyamidoamines and acid anhydrides.

The product may be an ink comprising the reaction product of an alkyd resin; pigments; solvents; and additives. The alkyd resin may be a short, medium or long alkyd resin synthesized from High alpha linolenic acid flax (linseed) oil or the alkyd resin may be a short, medium or long alkyd resin synthesized from a blend of High alpha linolenic acid flax (linseed) oil and another naturally occurring drying oil selected from regular flax (linseed) oil or soybean oil. The solvent may be derived from High alpha linolenic acid flax (linseed) oil or from a blend of High alpha linolenic acid flax (linseed) oil and another naturally occurring drying oil selected from regular flax (linseed) or soybean oil.

The product may be a zein film coating comprising High alpha linolenic acid flax (linseed) oil cured with ultraviolet light.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

The terms "high linolenic acid linseed oil" and "high linolenic acid flax seed oil" and "High alpha linolenic acid flax (linseed) oil" are used interchangeably herein and refer to oil, for example unmodified or natural oil, that is, oil that following extraction from flax seeds has not been chemically, enzymatically or otherwise modified to increase the alpha linolenic content thereof, derived from flax seed having at least 65% alpha linolenic acid of total fatty acids, or 65-95% alpha linolenic acid, 65-94% alpha linolenic acid, 65-93% alpha linolenic acid, 65-92% alpha linolenic acid, 65-91% alpha linolenic acid, 65-90% alpha linolenic acid, 65-89% alpha linolenic acid, 65-88% alpha linolenic acid, 65-87% alpha linolenic acid, 65-86% alpha linolenic acid, 65-85% alpha linolenic acid, 65-84% alpha linolenic acid, 65-83% alpha linolenic acid, 65-82% alpha linolenic acid, 65-81% alpha linolenic acid, 65-80% alpha linolenic acid, 65-79% alpha linolenic acid, 65-78% alpha linolenic acid, 65-77% alpha linolenic acid, 65-76% alpha linolenic acid, 65-75% alpha linolenic acid, 65-74% alpha linolenic acid, 65-73% alpha linolenic acid, 65-72% alpha linolenic acid, 65-71% alpha linolenic acid, 65-70% alpha linolenic acid, 65-69% alpha linolenic acid, 65-68% alpha linolenic acid, 65-67% alpha linolenic acid, 65-66% alpha linolenic acid, 67-95% alpha linolenic acid, 67-94% alpha linolenic acid, 67-93% alpha linolenic acid, 67-92% alpha linolenic acid, 67-91% alpha linolenic acid, 67-90% alpha linolenic acid, 67-89% alpha linolenic acid, 67-88% alpha linolenic acid, 67-87% alpha linolenic acid, 67-86% alpha linolenic acid, 67-85% alpha linolenic acid, 67-84% alpha linolenic acid, 67-83% alpha linolenic acid, 67-82% alpha linolenic acid, 67-81% alpha linolenic acid, 67-80% alpha linolenic acid, 67-79% alpha linolenic acid, 67-78% alpha linolenic acid, 67-77% alpha linolenic acid, 67-76% alpha linolenic acid, 67-75% alpha linolenic acid, 67-74% alpha linolenic acid, 67-73% alpha linolenic acid, 67-72% alpha linolenic acid, 67-71% alpha linolenic acid, 67-70% alpha linolenic acid, 67-69% alpha linolenic acid, 67-68% alpha linolenic acid, 70-95% alpha linolenic acid, 70-94% alpha linolenic acid, 70-93% alpha linolenic acid, 70-92% alpha linolenic acid, 70-91% alpha linolenic acid, 70-90% alpha linolenic acid, 70-89% alpha linolenic acid, 70-88% alpha linolenic acid, 70-87% alpha linolenic acid, 70-86% alpha linolenic acid, 70-85% alpha linolenic acid, 70-84% alpha linolenic acid, 70-83% alpha linolenic acid, 70-82% alpha linolenic acid, 70-81% alpha linolenic acid, 70-80% alpha linolenic acid, 70-79% alpha linolenic acid, 70-78% alpha linolenic acid, 70-77% alpha linolenic acid, 70-76% alpha linolenic acid, 70-75% alpha linolenic acid, 70-74% alpha linolenic acid, 70-73% alpha linolenic acid, 70-72% alpha linolenic acid, or 70-71% alpha linolenic acid.

High alpha linolenic acid flax (linseed) oil with greater than 65% alpha linolenic acid as described herein is produced by cold pressing High alpha linolenic acid flaxseed without the use of solvents or hexanes. This all natural process crushes the High alpha linolenic acid flax (linseed) seed to produce the oil. The High alpha linolenic acid flax (linseed) oil naturally contains a high alpha linolenic acid content as described herein. High alpha linolenic acid flaxseed with alpha linolenic acid content of greater than 65% is the result of careful plant breeding and in field selection as described in U.S. Pat. No. 6,870,077 and PCT Application WO03/064576 and included herein as reference. As will be appreciated by one of skill in the art, the varieties described in U.S. Pat. No. 6,870,077 and PCT Application WO03/064576 may be bred with other flax varieties to generate novel High alpha linolenic acid varieties with other desirable traits as described therein.

The terms "low linolenic flax (linseed) oil" and "regular flax (linseed) oil" and 'normal flax (linseed) oil' and "non-high linolenic (linseed) oil" are used interchangeably herein and refer to oil derived from flax seed having less than 65% alpha linolenic acid.

In some embodiments the useful oil has the following characteristics: 70 to 90% C18:3 alpha linolenic acid, an iodine value from about 217 to about 308, an oxirane value from about 10.0 to about 15% and a density of 0.92 g/ml The iodine value or iodine number is a measure of degree of saturation of a fatty acid i.e. total amount of carbon-carbon double bonds in a unit weight of oil and is a measure of the number of grams of iodine which will combine with 100 grams of the oil.

The fatty acid composition of most flax varieties is noted above, whereas High alpha linolenic acid flax (linseed) oil fatty acid composition may be:

| Common Name | Fatty Acid | Percentage |
| --- | --- | --- |
| Palmitic Acid | 16:0 | 3-6 |
| Palmitoleic Acid | 16:1 | <0.5 |
| Stearic Acid | 18:0 | 2-6 |
| Oleic Acid | 18:1 | 3-14 |
| Linoleic Acid | 18:2 | 3-12 |
| Alpha Linolenic Acid | 18:3 (n − 3) | 68-88 |

-continued

| Common Name | Fatty Acid | Percentage |
| --- | --- | --- |
| Arachidic Acid | 20:0 | <0.5 |
| Eicosenoic Acid | 20.1 | <0.5 |

As discussed above, high linolenic acid flax has linolenic acid content above 65%, for example 65-90%. Such high linolenic acid flax varieties have been described in U.S. Pat. No. 6,870,077 and PCT application WO03/064576.

Described herein is the use of High alpha linolenic acid flax (linseed) oil having 65% or 67% or 70% or greater level of linolenic acid in different reactions to produce a number of useful products including alkyds, epoxies, linoleum, inks and coatings as discussed below.

Alkyds

Traditionally, alkyd resins are defined as the reaction product of polyhydric alcohols and polybasic acids. The first coating binders were reaction products of glycerol and phthalic anhydride (glyptals) but these were too brittle. Modification of the glyptals with fatty acids and oils with increased strength of the alkyd resin. (ref Surface Coatings)

Alkyds are usually synthesized by four methods (ref Surface Coatings):

1. The hydroxyl group of the alcohol forms a ester bond with the carboxyl group directly 2. Transesterification such as alcoholysis or acidolysis. Alcoholoysis is a reaction between a glycol ester and an alcohol. Acidolysis is an interchange between a carboxylic ester and a glycol ester 3. Reactions of glycols or other polyfunctional hydroxyl compounds with anydrides such as phthalic anhydride 4. Reaction of acid chlorides with glycols or bisphenols known as Schotten-Baumann reaction Alkyd resins can be synthesized of various oil lengths. Oil length is defined as the grams of oil used per 100 g of alkyd produced. For illustrative purposes, a long oil alkyd resin with 60% High alpha linolenic acid flax (linseed) oil and a medium oil alkyd resin with 45% High alpha linolenic acid flax (linseed) oil are described herein. Short, medium and long alkyd resins derived from High alpha linolenic acid flax (linseed) oil are within the scope of the invention. Alkyd resins may be synthesized with any oil length of High alpha linolenic acid flax (linseed) oil. Alkyd resins synthesized with High alpha linolenic acid flax (linseed) oil are harder and more resistant to solvents than alkyds synthesized with regular flax (linseed) oil as High alpha linolenic acid flax (linseed) oil has a greater alpha linolenic acid content and therefore has more double bonds available for cross linking per unit oil. For example, a long oil alkyd with 60% High alpha linolenic acid flax (linseed) oil containing 65% or greater alpha linolenic acid content produces a better quality film, a stronger, harder, more scratch and solvent resistant film than a long oil alkyd with 60% regular flax (linseed) oil.

In an embodiment of the invention, there is synthesized an alkyd resin as the reaction product of from about 10 to about 50 mole %, based on the total composition of the alkyd resin, of a fatty acid, a fatty ester, or a naturally occurring oil with from about 10 to 40 mole % polyol, about 20 to about 40 mole % polyacid, 0 to about 10 mole % monofunctional acid and a catalyst.

The naturally occurring oil is High alpha linolenic acid flax (linseed) oil or a blend of High alpha linolenic acid flax (linseed) oil and another naturally occurring drying oil such as but not restricted to tung, oiticica, perilla, regular linolenic flax (linseed) oil and soybean oil. There are a variety of reasons to use a mixture of High alpha linolenic acid oil and another drying oil. Other naturally occurring oils such as tung oils have properties which differ from High alpha linolenic acid oil. Tung oil contains more reactive conjugated double bonds. One would add tung oil to increase crosslinking. Another consideration is cost. Prices of different oils fluctuate based on supply and market demand. It may be more cost effective to partially substitute one drying oil for another. Ratios of High alpha linolenic acid to other drying oils would range from 99% High alpha linolenic acid oil: 1% other oil to 1% High alpha linolenic acid oil: 99% other oils. Alkyd resins made with higher concentrations High alpha linolenic acid flax (linseed) oil would be stronger, more flexible and more resistant to solvents because of the greater amount of crosslinkages. For example, a blend of 500 ml refined High alpha linolenic acid flax (linseed) oil and 500 ml refined regular flax (linseed) oil, or a blend of 750 ml refined High alpha linolenic acid flax (linseed) oil and 250 ml of refined regular (linseed) oil could be used. Different ratios of components for different applications will result in different qualities of end product. The higher the content of High alpha linolenic acid flax (linseed) oil in relation regular flax (linseed) oil the final product is stronger, harder and more resistant to scratches and solvents due to the higher alpha linolenic acid content of High alpha linolenic acid flax (linseed) oil and the greater amount of cross linkages formed during the drying process.

The naturally occurring High alpha linolenic acid flax (linseed) oil contains triglycerides which are composed of three unsaturated fatty acids side chains attached to a glycerol backbone. When the glycerol is removed free fatty acids are produced. The fatty acid is derived from High alpha linolenic acid flax (linseed) oil by saponification, a process by which triglycerides are reacted with an alkali such as sodium or potassium hydroxide to produce glycerol and a fatty acid salt or 'soap' through hydrolysis of the fatty acid ester bond.

The fatty ester is derived from fatty acids in High alpha linolenic acid flax (linseed) oil by reaction with an alcohol. A fatty acid and an alcohol yields an ester and water. The fatty ester is produced when the glycerol backbone removed and each free fatty acid is bonded through the carboxyl group to another R group. For example:

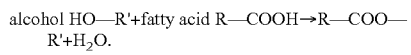

In some embodiments of the alkyd resin composition, the polyol comprises at least one of sorbitol, 1,2,3,6-hexane tetrol, 1,4-sorbitan, pentaerythritol, dipentaerythritol, tripentaerythritol, 1,2,4-butanetriol, 1,2,5-pentanetriol, glycerol, 2-methyl propanetriol, 2-methyl-1,2,4-butanetriol, trimethylol ethane, trimethylol propane, and 1,3,5-trihydroxymethyl benzene.

In some embodiments of the alkyd resin composition, the polyacid comprises at least one of aliphatic dibasic acid such as malonic acid, succinic acid, glutaric acid, adipic acid, pimeric acid, suberic acid, azelaic acid, sebacic acid and hexahydrophthalic anhydride, aliphatic unsaturated dibasic acid such as maleic acid, maleic anhydride, fumaric acid, itaconic acid and citraconic acid, aromatic dibasic acid such as phthalic anhydride, phthalic acid, terephthalic acid and isophthalic acid and methyl esters and ethyl esters thereof.

In some embodiments of the alkyd resin composition, the optional drier catalyst comprises but is not limited to cobalt naphthenate, lead naphthenate, zirconium naphthenate, cobalt octanoate, zirconium octanoate, amine compounds, or other suitable salts of cobalt, zirconium, calcium, and manganese. The optional drier catalyst greatly decreases the dry time due to cross linking. However, environmentally sensitive applications such as allergen free construction may prefer to limit the use of a drier. Drying or cross linking without a drier will occur over time due to autoxidation however this occurs over a much longer period (days).

Within the scope of the invention the alkyd resin derived from High alpha linolenic acid flax (linseed) oil may be modified with at least one of but not restricted to nitrocellulose, amino resins, chlorinated rubber, phenolic resins, vinyl, acrylic, vinyl acetate copolymer resins, silicone, polyamides and polycarbonates.

Epoxidized Oil and Epoxies

An epoxidized drying oil such as epoxidized High alpha linolenic acid flax (linseed) oil is an alternative to petrochemical derived plasticizers. The naturally occurring High alpha linolenic acid flax (linseed) oil contains triglycerides which are composed of three unsaturated fatty acids side chains attached to a glycerol backbone as described above. The fatty acid side chain is primarily alpha linolenic acid. Epoxidation of the triglycerides may be accomplished by mixing the refined oil with peracids wherein the acid, peracid or peroxyacid is one of but not limited to m-chloroperoxybenzoic acid (m-CPBA), peroxyformic acid, peroxyacetic acid, peroxybenzoic acid and hydrogen peroxide. To epoxidize the oil i.e. to add oxygen to the C—C double bonds in the fatty acid chain one of these peracids is needed as the initial source of the oxygen i.e. these peracids will add oxygen to the double bond. Epoxidation of the triglyceride is also achieved by air oxidation, a much slower process or enzymatically with peroxygenase, a more environmentally friendly process. By any of these methods, epoxidation creates cyclic 3-membered oxygen at the site of double bonds of the fatty acid side chains. The oxirane value of epoxidized High alpha linolenic acid flax (linseed) oil is at least 10.0. The high oxirane value of epoxidized High alpha linolenic acid flax (linseed) oil indicates that there are more reactive sites available for cross linking. Accordingly, products synthesized with epoxidized High alpha linolenic acid flax (linseed) oil will be stronger as there are more long chain fatty acid residues which are epoxidized. Epoxidation increases the reactivity of the C—C double bonds in the fatty acid chain. It is these sites which form 'cross linkages' i.e. one fatty acid chain will bond to another fatty acid chain by forming an ether bond C—O—C.

Epoxies are formed from the reaction products of High alpha linolenic acid flax (linseed) oil epoxy resin and a curing agent such as but not limited to amines, polyfunctional amines, polyethyleneamines, polyamidoamines and acid anhydrides.

In some embodiments of the epoxy composition, the High alpha linolenic acid flax (linseed) oil epoxy resin is epoxidized High alpha linolenic acid flax (linseed) oil or an epoxidized blend of High alpha linolenic acid flax (linseed) oil and another naturally occurring oil such as regular flax (linseed) oil. Different percentages of components for different applications will result in different qualities of end product.

Epoxies have a very high adhesion to a number of different materials for example but not limited to polymer, wood, metal, glass, polyethylene, polypropylene, sand, silicon, concrete and natural fibre. The High alpha linolenic acid flax (linseed) oil epoxies also have high adhesion, tear strength and surface hardness as compared to epoxies prepared with regular flax (linseed) oil. The High alpha linolenic acid flax (linseed) oil with 65% or greater linolenic acid epoxies also show a thermal stability up to 180 C.

In an embodiment of the invention there is provided an aluminum epoxy which is a two part epoxy resin component for the lamination of aluminum. Component A is an epoxy synthesized from High alpha linolenic acid flax (linseed) oil and component B is a mixture of polycarbonacids. In some embodiments, 1-3 parts component A is mixed with 0.5-2 parts component B. Component B may be modified for use with hardened aluminum. Different percentages of components for different applications will result in different qualities of end product aluminums. In some embodiments, the ratio may be 4 parts epoxy to 1 part hardener. This is an environmentally friendly product as no volatile organic compounds are released.

In an embodiment of the invention, there is provided a carbon fibre which is a two part epoxy resin component for the binding of carbon fibre to carbon fibre or carbon fibre with aluminum or carbon fibre with glass. Component A consists of epoxy resin synthesized from High alpha linolenic acid flax (linseed) oil which component B is a mixture of polycarbonacids. The epoxy is an adhesive for glass/glass and glass/acryl compounds for glass fibre laminates, polymers, parquet floors, and film/film compounds for food applications.

In an embodiment of the invention there is provided a fibre glass epoxy which is a two part epoxy resin compound for the lamination of fibreglass. Component A consists of epoxy from High alpha linolenic acid flax (linseed) oil while component B is a mixture of polycarbonacids. Different percentages of components for different applications will result in different qualities of end product fibreglass with a different percentage for different fibre glass types on account of the coverings on different fibreglass base fibres.

In another embodiment of the invention there is provided a glass/acrylic epoxy which is a two part epoxy resin component for glass/glass and glass/acrylic compounds and glass to fibreglass laminates.

In another embodiment of the invention there is provided an environmentally friendly 'green' glue which is two part epoxy resin for general adhesive applications such as metal, wood, plastics, polyethylene and aluminum for household, agricultural and light industrial trade use. 'Green' glue can be laminated with or without fillers. Different percentages of components for different applications will result in different qualities of end product. As discussed above, the glue is 'green' or environmentally friendly in that no or minimal volatile compounds are released.

In another embodiment of the invention there is provided a polyethylene/aluminum epoxy resin for binding polyethylene plastics with aluminum.

In another embodiment of the invention there is provided a polymer concrete epoxy for the manufacture of polymer concrete.

In another embodiment of the invention there is provided an environmentally friendly food film cover which is a two part epoxy resin component for film/film compounds such as food wrappings and outer coatings of capsules.

The naturally occurring oil is High alpha linolenic acid flax (linseed) oil or a blend of High alpha linolenic acid flax (linseed) oil and another naturally occurring drying oil such as but not restricted to tung, oiticica, perilla, regular linolenic flax (linseed) oil and soybean oil. For example, a blend of 500 ml refined High alpha linolenic acid flax (linseed) oil and 500 ml refined regular flax (linseed) oil, or a blend of 750 ml refined High alpha linolenic acid flax (linseed) oil and 250 ml of refined regular (linseed) oil could be used. Different ratios of components for different applications will result in different qualities of end product.

The naturally occurring High alpha linolenic acid flax (linseed) oil contains triglycerides which are composed of three unsaturated fatty acids side chains attached to a glycerol backbone. When the glycerol is removed free fatty acids are produced. The fatty acid is derived from High alpha linolenic acid flax (linseed) oil by saponification, a process by which triglycerides are reacted with an alkali such as sodium or potassium hydroxide to produce glycerol and a fatty acid salt or 'soap' through hydrolysis of the fatty acid ester bond.

The fatty ester is derived from fatty acids in High alpha linolenic acid flax (linseed) oil by reaction with an alcohol. A fatty acid and an alcohol yields an ester and water. The fatty ester is produced when the glycerol backbone removed and each free fatty acid is bonded through the carboxyl group to another R group. For example:

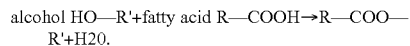

alcohol HO—R'+fatty acid R—COOH→R—COO—R'+H20.

In some embodiments of the epoxidized oil composition, the oil, fatty acid or fatty ester as described above are reacted with peracid or peroxyacid is one of but not limited to m-chloroperoxybenzoic acid (m-CPBA), peroxyformic acid, peroxyacetic acid, peroxybenzoic acid and hydrogen peroxide.

Coatings: Paint, Varnishes, Stains, Enamels

Oil paints and enamels can be synthesized from a mixture of alkyd resins, solvents, driers, additives, pigments and drying oil. The alkyd resin derived from High alpha linolenic acid flax (linseed) oil as described herein forms 3 to 45% of the components of the paint. The characteristics of the paint or enamel are determined by the characteristics of the resin, the drying oil and pigments. Paint based on High alpha linolenic acid flax (linseed) alkyd resin as compared to regular flax (linseed) oil resin will be more resistant to solvent and more scratch resistant because of the increased cross linkages per unit oil.

The coating composition wherein the alkyd resin is a short, medium or long alkyd resin derived from High alpha linolenic acid flax (linseed) oil as described herein.

The coating composition wherein the pigments are but not limited to one or more of titanium dioxide, silicates, zinc oxide, calcium carbonate, tinting color, red oxide, rust inhibitive pigment, zinc stearate, modified zinc phosphate, and the like.

In some embodiments of the coating composition, the drying oil is High alpha linolenic acid flax (linseed) oil with 65% or greater alpha linolenic acid as described above.

In other embodiments of the coating composition, the drying oil is a blend of High alpha linolenic acid flax (linseed) oil with 65% or greater alpha linolenic acid blended with another drying oil such as but not limited to regular flax (linseed) oil, tung, oiticica, perilla and soybean oil as described above.

Varnishes require a naturally occurring oil with a high degree of unsaturation such as linseed, tung, oiticica and dehydrated castor oil. High alpha linolenic acid flax (linseed) oil has a higher iodine value as compared to regular linseed oil due to the higher alpha linolenic acid content, and therefore has more unsaturated bonds per unit oil. The varnish would be more scratch and solvent resistant.

In some embodiments of the varnish composition, the varnish consists of a compatible mixture of resin, naturally occurring High alpha linolenic acid flax (linseed) oil containing 65% or greater alpha linolenic acid and solvents.

In other embodiments of the varnish composition, the resin is one of but not limited to amber, copal, rosin, alkyd or polyurethane resins.

In yet other embodiments of the varnish composition, the naturally occurring oil may be a blend of High alpha linolenic acid flax (linseed) oil containing 65% or greater alpha linolenic acid and another or other drying oil(s) such as but not restricted to regular flax (linseed) oil, tung, oiticica, perilla and dehydrated castor oil.

In some embodiments of the varnish composition, the solvent is one of but not restricted to mineral spirits, turpentine and xylene.

Anti-Spalling Surface Concrete Preservative

Linseed oil based compounds can protect concrete surfaces exposed to weathering by rain, salt water, wind, freeze-thaw cycles as well as applied chemicals and de-icing salts. Linseed oil is a natural water repellant and penetrates the concrete surface to prevent disintegration by forming a water resistant film. High alpha linolenic acid flax (linseed) oil with 65% or greater alpha linolenic acid content improves upon existing concrete preservatives by forming a stronger, more solvent resistant, more weather resistant film because of the additional crosslinking due to the higher alpha linolenic acid content in High alpha linolenic acid flax (linseed) oil.

In some embodiments of the concrete preservative, the concrete preservative consists of High alpha linolenic acid flax (linseed) oil, High alpha linolenic acid flax (linseed) oil based alkyd, mineral spirits and dryers.

In yet other embodiments of the concrete preservative composition, the drying oil is High alpha linolenic acid flax (linseed) oil with 65% or greater alpha linolenic acid or a blend of High alpha linolenic acid flax (linseed) oil with 65% or greater alpha linolenic acid with another drying oil such as but not limited to regular flax (linseed) oil, tung, oiticica, peril and soybean oil. Different ratios of components for different applications will result in different qualities of end product.

In some embodiments of the concrete preservative composition, the High alpha linolenic acid flax (linseed) oil based alkyd as described herein is used.

In some embodiments of the concrete preservative composition, the dryers may be one or more of but not limited to cobalt, manganese, zirconium, lead salts or napthenic acids.

In some embodiments of the concrete preservative, the proportional ratio of High alpha linolenic acid flax (linseed) oil containing 65% or greater alpha linolenic acid to mineral spirits ranges from 90:10 to 20:80 with the preferred mixture being 50:50. Different ratios of components for different applications will result in different qualities of end product.

Solidified Linseed Oil or Linoxyn

Solidified linseed oil, linoleum cement, Bedford cement or linoxyn is a component of linoleum floor covering along with wood flour or cork dust and burlap, fabric or canvas backing and possibly pigments. Solidified linseed oil, linoxyn, linoleum cement or Bedford cement is synthesized from oxidized linseed oil and other substances to form a thick mixture. Cheaper polyvinyl chloride substitutes for linseed based linoleum are common. However, the PVC linoleums release volatile organic components into the air. Accordingly, linoleum based on High alpha linolenic acid flax (linseed) oil represents an environmentally friendly and improved product. High alpha linolenic acid flax (linseed) oil with 65% or greater alpha linolenic acid content forms stronger, more flexible, more scratch resistant, more solvent resistant and more durable linoxyns and linoleums than linoleums and linoxyns created from regular flax (linseed) oil. High alpha linolenic acid flax (linseed) oil contains more alpha linolenic acid per unit oil. Therefore there are more unsaturated carbon-carbon double bonds available for crosslinking. This produces a stronger, more scratch resistant, more solvent resistant linoxyn.

In some embodiments of the solidified linseed oil, linoleum cement, Bedford cement or linoxyn, the solidified linseed oil is synthesized from High alpha linolenic acid flax (linseed) oil containing 65% or greater alpha linolenic acid content, a polyvalent alcohol and a resin.

In some embodiments of the solidified linseed oil, linoleum cement, Bedford cement or linoxyn composition, the oil is High alpha linolenic acid flax (linseed) oil having at least 65% or greater alpha linolenic acid of total fatty acid content, or a blend of High alpha linolenic acid flax (linseed) oil having at least 65% alpha linolenic acid and another naturally occurring drying oil such as but not limited to regular flax (linseed) oil or esterified High alpha linolenic acid flax (linseed) oil having at least 65% or greater alpha linolenic acid of total fatty acid content or a blend of esterified High alpha linolenic acid flax (linseed) oil having at least 65% alpha linolenic acid and another esterified naturally occurring drying oil such as but not limited to esterified regular flax (linseed) oil. The preferred embodiment of the invention is esterified High alpha linolenic acid flax (linseed) oil.

In some embodiments of the solidified linseed oil, linoleum cement, Bedford cement or linoxyn composition, the polyvalent alcohol is one or more of but not limited to glycerol or pentaerythritol.

In some embodiments of the solidified linseed oil, linoleum cement, Bedford cement or linoxyn composition, the resin is one of but not limited alkyd resins or rosin.

In yet other embodiments of the solidified linseed oil, linoleum cement, Bedford cement or linoxyn composition, the ratio by weight of High alpha linolenic acid flax (linseed) oil or High alpha linolenic acid flax (linseed) oil blend to resin is 60 to 90% High alpha linolenic acid flax (linseed) oil or High alpha linolenic acid flax (linseed) oil blend and 40 to 10% resin. In a preferred embodiment the High alpha linolenic acid flax (linseed) oil comprises 50% and the resin comprises 50% of the total mixture by weight. Different ratios of components for different applications will result in different qualities of end product.

Maleinated Linseed Oil

Maleinated linseed oil is useful as an anhydride-functional curing agent (Warth et al, 1997). High alpha linolenic acid flax (linseed) oil is preferable to regular flax (linseed) oil because of the greater number of unsaturated double bonds per unit oil available to react with the maleic anhydride. Thus there are more sites available to form cross linkages in the polymer network.

In some embodiments of the maleinated linseed oil composition, the maleinated linseed oil is the reaction product of High alpha linolenic acid flax (linseed) oil with 65% or greater alpha linolenic acid content or a blend of High alpha linolenic acid flax (linseed oil) and another naturally occurring oil such as but not limited to regular flax (linseed) oil, soybean oil or canola oil and maleic anhydride.

Inks

In vegetable oil based inks, High alpha linolenic acid flax (linseed) oil alkyd resins have uses as the adhesive resinous binder which adheres the ink to the surface. High alpha linolenic acid flax (linseed) oil is also a solvent and additive to improve transfer of ink pigments and surface leveling. High alpha linolenic acid flax (linseed) oil alkyd resin forms a strong adhesive bond with the surface due to the higher alpha linolenic acid content and greater capability to form cross linkages per unit oil than regular flax (linseed) oil.

The ink wherein the ink is reaction product pigments, additives, solvents and a short, medium or long High alpha linolenic acid flax (linseed) oil alkyd resin as described herein or an alkyd resin derived from a blend of High alpha linolenic acid flax (linseed) oil and another drying oil such as but not limited to regular flax (linseed) oil or soybean oil, pigments, additives and solvents.

In some embodiments of the ink composition, the solvent is derived from High alpha linolenic acid flax (linseed) oil.

The ink composition wherein the solvent is derived from a blend of High alpha linolenic acid flax (linseed) oil and another naturally occurring drying oil such as but not limited to regular flax (linseed) or soybean oil such as 50% High alpha linolenic acid flax (linseed) oil and 50% regular flax (linseed) oil. Different ratios of different components for different applications will yield products with different qualities.

Zein Film Coatings

Zein films are biodegradable plastic films derived from corn endosperm. In an embodiment of the invention coating such films with High alpha linolenic acid flax (linseed) oil which is then cured with ultraviolet light will strengthen such films, improve tear resistance, increase resistance to solvents, increase scratch resistance. These improved characteristics are a result of the higher alpha linolenic acid content of High alpha linolenic acid flax (linseed) oil which has more sites for cross linkages per unit oil than regular flax (linseed) oil.

The invention will now be illustrated by way of example. It is of note that the examples are for illustrative purposes and are not necessarily limiting.

Example 1

Preparation of Alkyd Resin from High Alpha Linolenic Acid Flax (Linseed) Oil with 65% or Greater Alpha Linolenic Acid Alkyd resins were prepared from High alpha linolenic acid flax (linseed) oil from Polar Foods, Inc. The High alpha linolenic acid flax (linseed) oil was alkali refined to remove free fatty acids, phospholipids and minerals. All refining reactions were carried out with a nitrogen sparge. 1 L of High alpha linolenic acid flax (linseed) oil was added to a 4-neck round bottom flask. 500 ml of distilled water was added. The mixture was stirred and heated to 80 C. The mixture was transferred to a separatory funnel and the lower layer was drained away. The remaining mixture was returned to the round bottom flask. 800 ml of 1 M NaOH was added. The mixture was stirred and the bottom layer drained away. The water wash was repeated. 13.8 g of activated charcoal was added. The mixture was stirred and heated to 100 C for 30 minutes. The mixture was vacuum filtered to removed the activated charcoal. To remove residual water, 15 g of anhydrous $NaSO_4$ was added to the mixture overnight. The oil was vacuum filtered through diatomaceous earth. Both long and medium oil alkyds were synthesized from High alpha linolenic acid flax oil. Medium oil alkyd contained 75 g of High alpha linolenic acid flax (linseed) oil, 36.3 g of glycerol, 63.05 g of phthalic anhydride. Long oil alkyd contained 250 g of refined High alpha linolenic acid flax (linseed) oil, 68.1 g of glycerol, 112.2 g of phthalic anhydride. The refined High alpha linolenic acid oil was added to a 4-neck round bottom flask with glycerol, stirred and heated to 120 C under argon gas. 0.2 g lithium hydroxide monohydrate was added as catalyst. The temperature was increased and held at 240 C for one hour until solution was soluble in 3 parts ethanol. The mixture was removed from heat and phthalic anhydride was added. When temperature had dropped to 100 C, 100 ml xylene as solvent was added. Temperature was increased to 210 C and excess water was removed from a Dean Stark trap. The acid number of the mixture was tested every hour. The mixture was cooked until the acid number fell below 10, approximately 3 hours. Samples of the 'neat' alkyd were mixed ligroin as solvent and driers (1.5% cobalt, 3.6% zirconium and 1.2% calcium).

Testing:

Alkyd films were cast on aluminum plates and dried at 150 C. Films were not tacky after 1 hour drying. The average thickness of films ranged from 11.5 to 13.4 um. As determined by the pencil hardness test (ASTM D3363), both medium and long High alpha linolenic acid alkyds were harder than regular linolenic alkyds as described below. Medium and long High alpha linolenic acid alkyds were of equal hardness, F on the standard designation. Regular linolenic long oil length alkyd was slightly harder than the regular linolenic medium oil length alkyd (B and 2B respectively). High alpha linolenic acid alkyds (5B on the standard designation) passed the cross hatch adhesion test (ASTM D3359). Both medium and long High alpha linolenic acid alkyds performed well on the MEK double rub test (ASTM D4752). Both medium and long High alpha linolenic acid alkyds were more resistant to solvent than regular medium and long oil length alkyds. Up to 300 double rubs were used to determine when the alkyd began to dissolve from the substrate. The High alpha linolenic acid long oil alkyd exceeded the limit of the test i.e. no change in film surface after 300 double rubs. The High alpha linolenic acid medium oil alkyd film surface began to dissolve after 250 double rubs. Regular linolenic long and medium oil length alkyd film surface began to dissolve after 130 and 154 double rubs respectively. High alpha linolenic acid long and medium oil films exceeded the limits of the strength (ASTM G14, ASTM D2794) and flexibility (ASTM D522) tests. High alpha linolenic acid long and medium oil films had greater than 32% elongation on the conical mandrel flexibility test. High alpha linolenic acid long and medium oil films did not crack at greater than 40 inch-lbs direct impact or greater than 40 inch-lbs reverse impact.

The High alpha linolenic acid are stronger than and more flexible than the regular linseed oil films.

Example 2

Preparation of Epoxidized High Alpha Linolenic Acid Linseed Oil

In an embodiment of the invention, there is synthesized epoxidized High alpha linolenic acid flax (linseed) oil by heating under reflux refined High alpha linolenic acid flax (linseed) oil with 60% perbenzoic acid or peracetic acid as in the method described by Motawie (Motawie, A. M. et al, 1995, Journal of Applied Polymer Science Vol 55. 1725-1732).

Example 3

Preparation of Rust Preventative Enamel Using High Alpha Linolenic Acid Long Oil Alkyd In an embodiment of the invention, there is synthesized an rust preventative enamel by blending 38% High alpha linolenic acid long oil alkyd with 25% titanium dioxide, 3% silicates and 34% solvents, driers and additives. The rust preventative enamel using High alpha linolenic acid long oil alkyd would be used on metal surfaces to prevent weathering and rust corrosion.

Example 4

Preparation of Wood Stain Using High Alpha Linolenic Acid Medium Oil Alkyd

In an embodiment of the invention, there is synthesized a wood stain by blending 17% High alpha linolenic acid medium oil alkyd with 15% titanium dioxide, 45% silicates and 23% solvents, driers and additives. The wood stain produced from High alpha linolenic acid medium oil alkyd would be more scratch and solvent resistant due to the greater alpha linolenic acid content in High alpha linolenic acid flax (linseed) oil and therefore the greater number of cross linkages occur in the drying process.

Example 5

Preparation of Wood Finish Using High Alpha Linolenic Acid Long Oil Alkyd

In an embodiment of the invention, there is synthesized a wood finish by blending 27% High alpha linolenic acid long oil alkyd with 9% refined High alpha linolenic acid flax (linseed) oil and 64% solvents, driers and additives. The wood finish produced from High alpha linolenic acid long oil alkyd would be more scratch and solvent resistant due to the greater alpha linolenic acid content in High alpha linolenic acid flax (linseed) oil and therefore the greater number of cross linkages occur in the drying process.

Example 6

Preparation of Varnish Using High Alpha Linolenic Acid Flax (Linseed) Oil

In an embodiment of the invention, there is synthesized a varnish by cooking refined High alpha linolenic acid flax (linseed) and High alpha linolenic acid long oil alkyd resin at 300 C for 30 minutes. The mixture is thinned with turpentine. The varnish is applied to a sanded wood surface and cured by ultraviolet light.

Example 7

Preparation of Anti-Spalling Concrete Preservative

In an embodiment of the invention, there is synthesized an anti-spalling concrete preservative by blending 30% High alpha linolenic acid medium oil alkyd with 20% High alpha linolenic acid flax (linseed) oil and 50% mineral spirits.

Example 8

Preparation of Solidified Linseed Oil

In an embodiment of the invention, there is synthesized a solidified linseed oil, linoleum cement, Bedford cement or linoxyn as the reaction product of a long oil alkyd resin derived from High alpha linolenic acid flax (linseed) oil as described above and commercially available rosin in a 1:1 mixture, heated to 125 C for 3 hours, then cooled to room temperature and processed into linoleum in the customary manner known in the art.

Example 9

Preparation of Maleinated High Alpha Linolenic Acid Linseed Oil

In an embodiment of the invention there is synthesized a maleinated linseed oil using an adapted method (Warth et al, 1997, Die Angewandte Makromolekulare Chemie 249 (1997) 79-92). 200 g of refined High alpha linolenic acid flax (linseed) oil is heated to 200 C with 40 g maleic anhydride added dropwise under nitrogen atmosphere and cooked for 7 hours.

Example 10

Preparation of High Alpha Linolenic Acid Epoxy

In an embodiment of the invention there is synthesized an epoxy based on epoxidized High alpha linolenic acid flax (linseed) oil mixed 3:1 with a hardener.

Example 11

In an embodiment of the invention there is synthesized an ink based on a medium oil length alkyd derived from High alpha linolenic acid flax (linseed) oil as described above blended with carbon black as pigment, dissolved in High alpha linolenic acid flax (linseed) oil as solvent.

Example 12

In an embodiment of the invention there is synthesized a zein film coating from High alpha linolenic acid flax (linseed) oil using an adapted method (Wang, Q and Padua, G. W. Properties of Zein Films Coated with Drying Oils. 2005 J. Agric. Food Chem. 53: 3444-3448). Zein films coated with High alpha linolenic acid flax (linseed) oil would be stronger and more flexible than zein films coated with regular flax (linseed) oil because of the higher alpha linolenic acid content of High alpha linolenic acid flax (linseed) oil which results in greater cross-linkages per unit oil.

While the preferred embodiments of the invention have been described above, it will be recognized and understood that various modifications may be made therein, and the appended claims are intended to cover all such modifications which may fall within the spirit and scope of the invention.

The invention claimed is:

1. An epoxy resin comprising:
 a high linolenic acid linseed oil that has an oxirane value of about 10% to about 15%, and comprises at least 65% of an alpha linolenic acid.

2. The epoxy resin of claim 1 further comprising a polyacid.

3. The epoxy resin of claim 2, wherein the polyacid is selected from the group consisting of malonic acid, succinic acid, glutaric acid, adipic acid, pimeric acid, suberic acid, azelaic acid, sebacic acid and hexahydrophthalic anhydride, maleic acid, maleic anhydride, fumaric acid, itaconic acid, citraconic acid, phthalic anhydride, phthalic acid, terephthalic acid, isophthalic acid, methyl esters thereof, and ethyl esters thereof.

4. The epoxy resin of claim 1, wherein the high linolenic acid linseed oil comprises at least 70% alpha linolenic acid.

5. The epoxy resin of claim 1, wherein the high linolenic acid linseed oil comprises 70% to 90% alpha linolenic acid.

6. The epoxy resin of claim 1 further comprising a curing agent selected from the group consisting of amines, polyfunctional amines, polyethyleneamines, polyamidoamines and mixtures thereof.

7. A method of preparing an epoxy resin comprising:
 admixing (A) a high linolenic acid linseed oil that has an oxirane value of about 10% to about 15%, and comprises at least 65% of an alpha linolenic acid and (B) a polyacid.

8. The method of claim 7 further comprising preparing the high linolenic acid linseed oil that has an oxirane value of about 10% to about 15% by epoxidizing the alpha linolenic acid,
 wherein epoxidizing the alpha linolenic acid includes reacting the alpha linolenic acid with a material selected from the group consisting of a peracid, a peroxyacid, or a peroxide.

* * * * *